United States Patent
Hwang

(10) Patent No.: US 11,769,899 B2
(45) Date of Patent: Sep. 26, 2023

(54) PRESS JIG AND METHOD OF MANUFACTURING SECONDARY BATTERY USING SAME

(71) Applicant: LG ENERGY SOLUTION, LTD., Seoul (KR)

(72) Inventor: Gyu Ok Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 76 days.

(21) Appl. No.: 17/383,731

(22) Filed: Jul. 23, 2021

(65) Prior Publication Data
US 2021/0351431 A1     Nov. 11, 2021

Related U.S. Application Data

(63) Continuation of application No. PCT/KR2020/008760, filed on Jul. 3, 2020.

(30) Foreign Application Priority Data

Oct. 30, 2019  (KR) .......... 10-2019-0136091

(51) Int. Cl.
| | | |
|---|---|---|
| *H01M 10/04* | (2006.01) | |
| *H01M 4/04* | (2006.01) | |
| *H01M 10/058* | (2010.01) | |
| *H01M 10/44* | (2006.01) | |

(52) U.S. Cl.
CPC ..... *H01M 10/0481* (2013.01); *H01M 4/0447* (2013.01); *H01M 10/058* (2013.01); *H01M 10/446* (2013.01)

(58) Field of Classification Search
CPC ............... H01M 10/0404; H01M 10/0481
See application file for complete search history.

(56) References Cited

U.S. PATENT DOCUMENTS

| | | | |
|---|---|---|---|
| 10,686,208 B2 * | 6/2020 | Bae ............... | H01M 50/618 |
| 2013/0065092 A1 | 3/2013 | Maeba et al. | |
| 2017/0317376 A1 | 11/2017 | Yoon et al. | |
| 2018/0226673 A1 * | 8/2018 | Bae ............... | H01M 10/058 |
| 2019/0051924 A1 | 2/2019 | Kim et al. | |
| 2019/0324089 A1 * | 10/2019 | Kang ............. | H01M 10/4285 |

(Continued)

FOREIGN PATENT DOCUMENTS

| | | |
|---|---|---|
| CN | 102201554 B | 3/2013 |
| CN | 203536531 U | 4/2014 |

(Continued)

OTHER PUBLICATIONS

Machine translation of the written opinion (no date).*

(Continued)

*Primary Examiner* — Amanda C. Walke
(74) *Attorney, Agent, or Firm* — Birch, Stewart, Kolasch & Birch, LLP

(57) ABSTRACT

A press jig includes a pair of plate-shaped members, each of which includes a plurality of protrusions spaced apart from each other on a surface thereof, the protrusions being configured to come into contact with the secondary battery when pressed; and a heating unit that heats the protrusions formed on the plate-shaped member. A method of manufacturing a secondary battery using the same is also provided.

14 Claims, 5 Drawing Sheets

(56) References Cited

U.S. PATENT DOCUMENTS

2020/0266474 A1    8/2020   Bae et al.
2021/0036357 A1*   2/2021   Ogata ............... H01M 10/0413

FOREIGN PATENT DOCUMENTS

| | | |
|---|---|---|
| JP | 9-293488 A | 11/1997 |
| JP | 2003-277081 A | 10/2003 |
| JP | 2008-140633 A | 6/2008 |
| JP | 2010-9978 A | 1/2010 |
| JP | 2010-9983 A | 1/2010 |
| JP | 2012-128952 A | 7/2012 |
| JP | 2013-84445 A | 5/2013 |
| JP | 2018-163858 A | 10/2018 |
| KR | 10-2014-0068551 A | 6/2014 |
| KR | 10-2015-0037049 A | 4/2015 |
| KR | 10-2015-0043754 A | 4/2015 |
| KR | 10-2015-0050212 A | 5/2015 |
| KR | 10-2015-0050223 A | 5/2015 |
| KR | 10-2015-0089555 A | 8/2015 |
| KR | 10-2016-0016174 A | 2/2016 |
| KR | 10-2016-0056207 A | 5/2016 |
| KR | 10-2016-0087115 A | 7/2016 |
| KR | 10-2017-0094106 A | 8/2017 |
| KR | 10-2017-0124336 A | 11/2017 |
| KR | 10-2018-0025805 A | 3/2018 |
| KR | 10-2018-0091255 A | 8/2018 |
| KR | 10-2019-0006920 A | 1/2019 |
| KR | 10-2233797 B1 * 3/2021 ........ H01M 10/0404 |
| WO | WO-2012133711 A1 * 10/2012 .......... H01M 2/1077 |

OTHER PUBLICATIONS

Machine translation of WO 2012/133711 (no date).*
Japanese Notice of Reasons for Refusal for Japanese Application No. 2021-539558, dated Jun. 14, 2022, with an English translation.
Extended European Search Report for European Application No. 20883552.0, dated Mar. 21, 2022.
International Search Report for PCT/KR2020/008760 dated Sep. 28, 2020.

* cited by examiner

[FIG. 1]
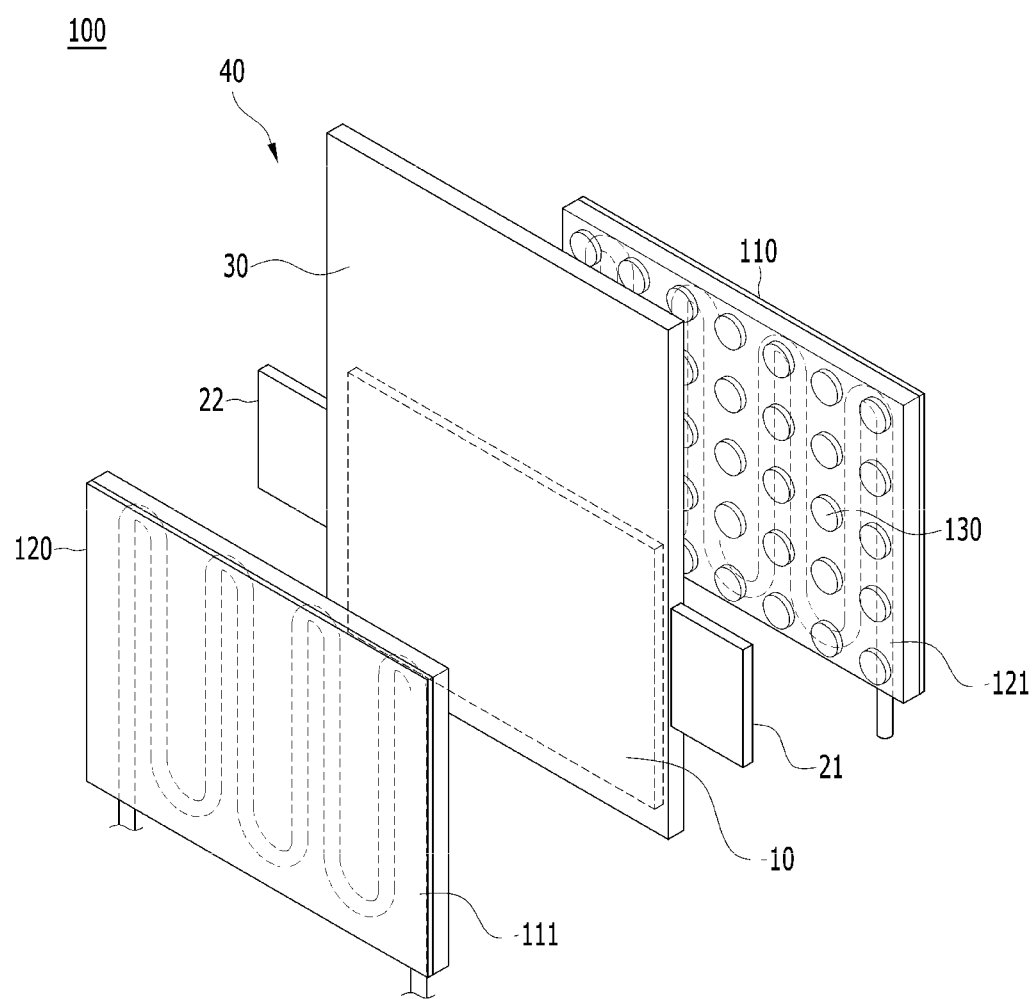

[FIG. 2]
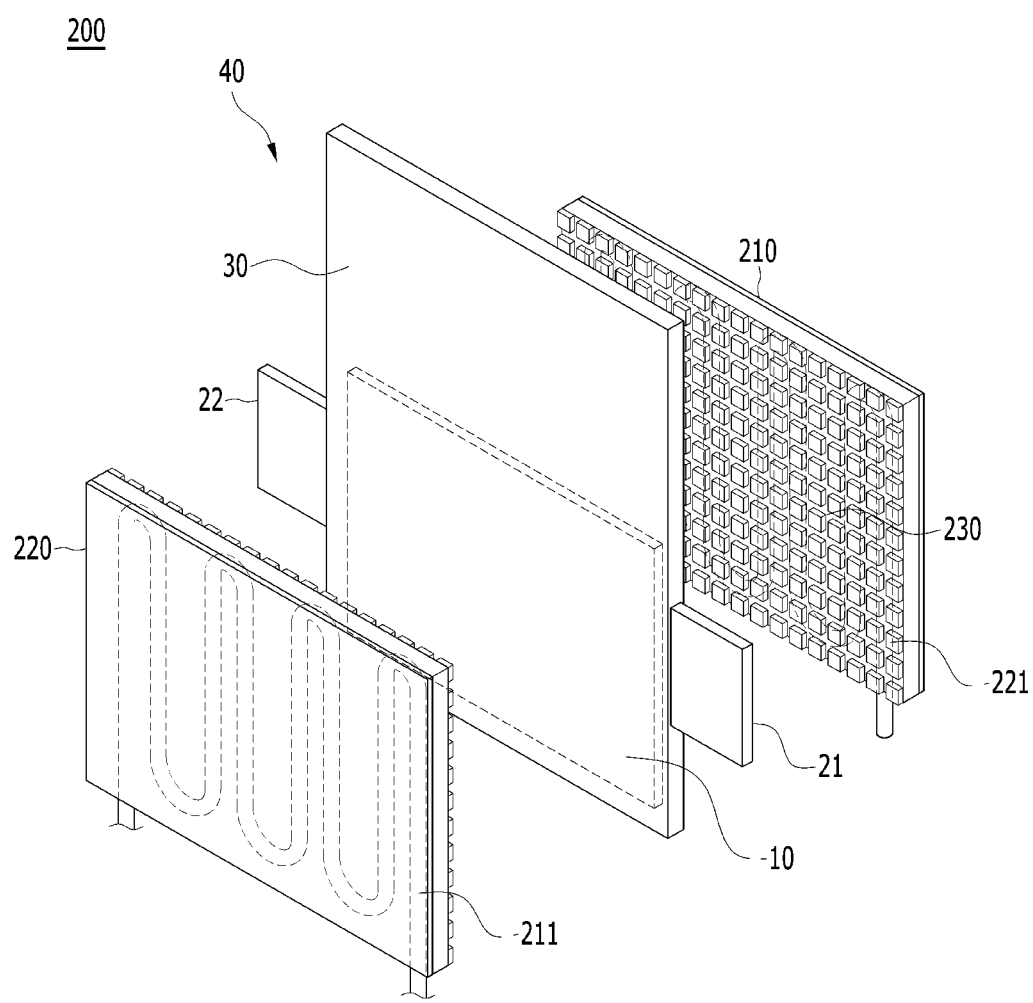

[FIG. 3]
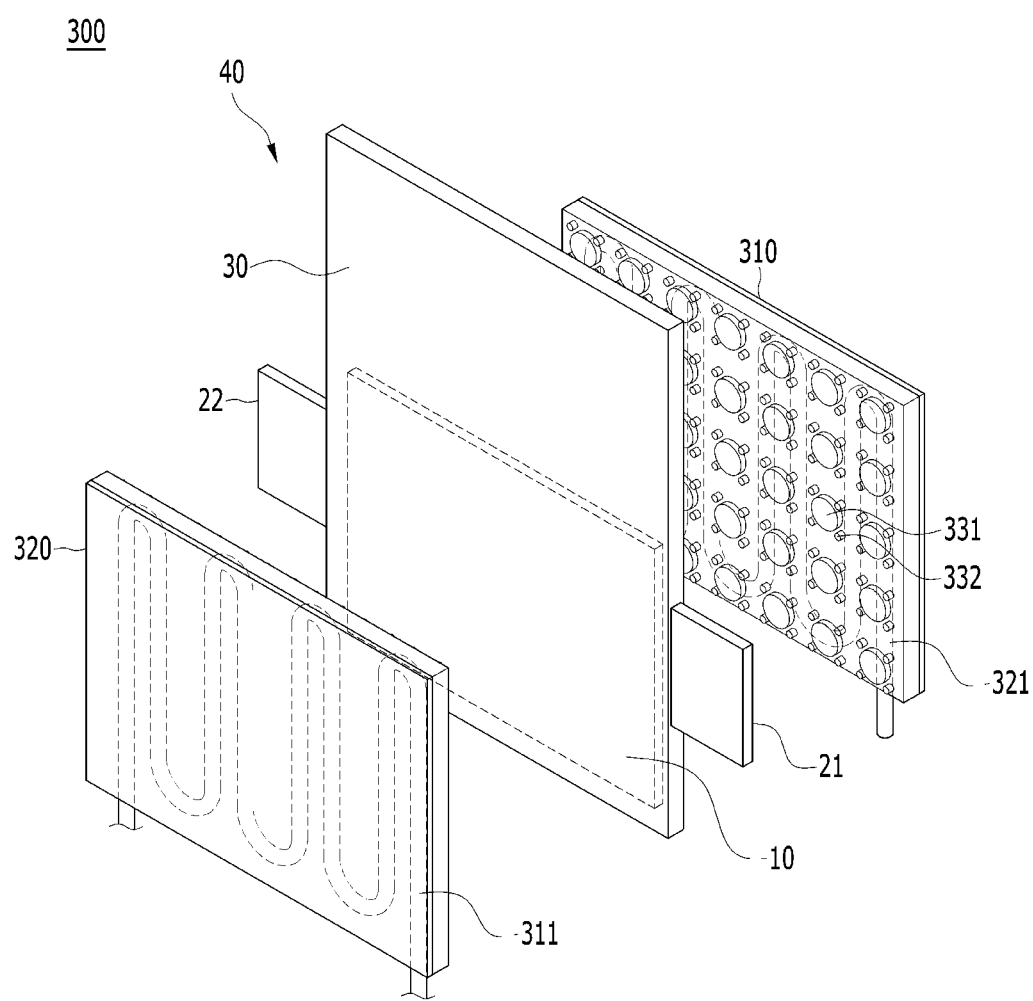

[FIG. 4]
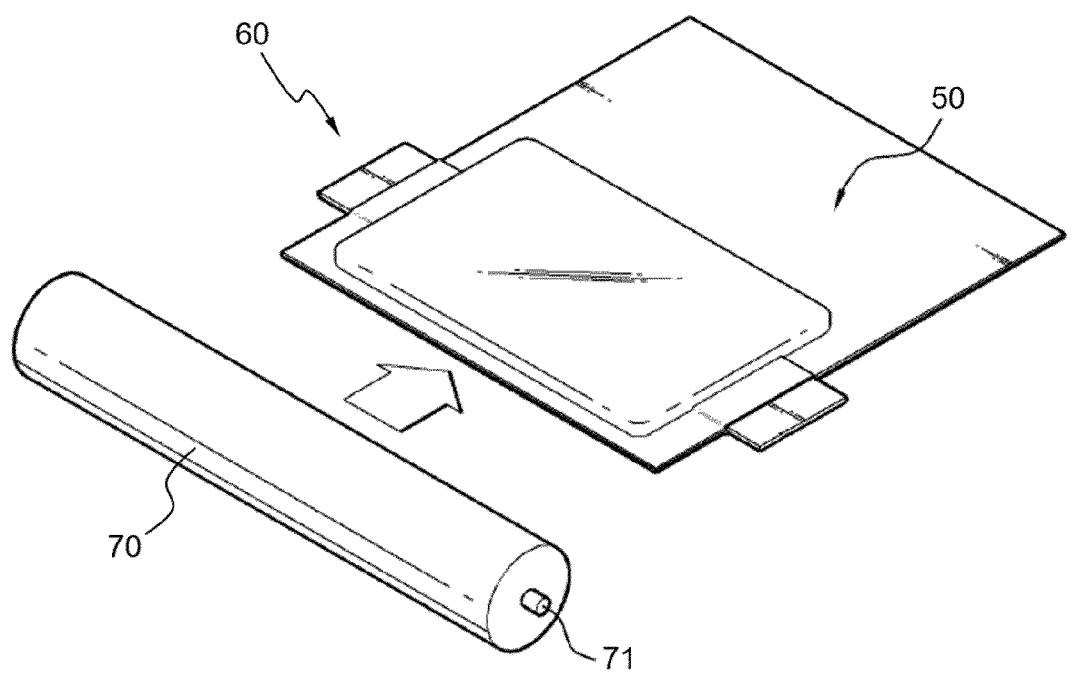

【FIG. 5】
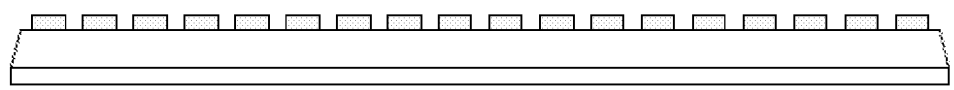
【FIG. 6】
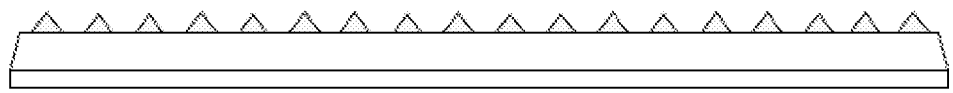
【FIG. 7】
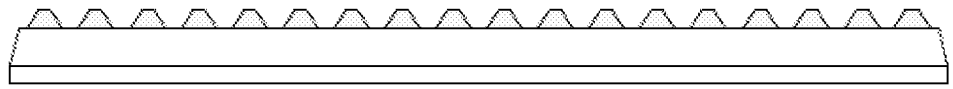
【FIG. 8】

PRESS JIG AND METHOD OF MANUFACTURING SECONDARY BATTERY USING SAME

CROSS-REFERENCE TO RELATED APPLICATIONS

This application is a Continuation of PCT International Application No. PCT/KR2020/008760, filed on Jul. 3, 2020, which claims priority under 35 U.S.C. 119(a) to Korean Patent Application No. 10-2019-0136091, filed on Oct. 30, 2019, which are hereby expressly incorporated by reference into the present application.

TECHNICAL FIELD

The present invention relates to a pressurizing jig and a method of manufacturing a secondary battery using the same, and more particularly, to a pressurizing jig that helps discharge gas by pressurizing a secondary battery during a cell activation process for a secondary battery, and a method of manufacturing a secondary battery using the same.

BACKGROUND ART

In recent years, as demand for portable electronic products such as notebook computers, video cameras, and portable telephones rapidly increases and electric vehicles, storage batteries for energy storage, robots, and satellites are developed, studies on high-performance secondary batteries capable of being recharged repeatedly have been actively performed.

The currently commercialized secondary rechargeable batteries include nickel-cadmium batteries, nickel-hydrogen batteries, nickel-zinc batteries, and lithium secondary batteries. Among them, the lithium secondary battery has a remarkable advantage over the nickel-based secondary battery because it has almost no memory effect, is free from charge and discharge, has very low self-discharge rate, and has high energy density. In general, such a secondary battery may be classified into a cylindrical or square can-type secondary battery and a pouch-type secondary battery according to an exterior material or an application form.

The secondary battery may be used in the form of a single secondary battery or a module, in which a plurality of secondary batteries are electrically connected, depending on the type of external device used. For example, small devices such as mobile phones can operate for a predetermined time with the output and capacity of one secondary battery, while medium-sized or large-sized devices such as notebook computers, portable DVDs, small personal computers, electric vehicles, and hybrid electric vehicles require the use of modules including a plurality of secondary batteries due to issues of output and capacity.

The module is manufactured by connecting a protection circuit or the like to a core pack in which a plurality of secondary batteries are arranged and connected in series and/or in parallel. In the case of using a square or pouch-type secondary battery as a unit secondary battery, after stacking so that the wide surfaces face each other, the electrode terminals can be easily manufactured by connecting them with a connecting member such as a bus bar. Therefore, when manufacturing a three-dimensional module having a hexahedral structure, a rectangular or pouch-type secondary battery is advantageous as a unit secondary battery.

Herein, since the pouch type secondary battery is formed by using a pouch exterior material composed of a multilayer film including a metal layer (foil) and a synthetic resin layer coated on the upper and lower surfaces of the metal layer, the weight of the battery can be remarkably reduced compared to the cylindrical or square shape using metal cans, which makes it possible for the battery to be lightened and changed into various forms. Its usage is also gradually increasing.

In general, pouch-type secondary batteries are manufactured through a process of assembling a secondary battery and a process of cell-activating a secondary battery, etc.

Conventional pouch exterior materials are generally made of a lower exterior material accommodating an electrode assembly and an upper exterior material sealing the upper portion of the lower exterior material. After accommodating the electrode assembly in the receiving portion of the lower exterior material, the edge around the lower exterior material receiving portion is made to be closely attached to the edge of the corresponding upper exterior material, a part of the attached portion is heat-sealed and an electrolyte is added, and the remaining part is vacuum-sealed, whereby a secondary battery is assembled.

In the cell activation process, a secondary battery is mounted on a predetermined jig for smooth current flow, and processing such as charging and discharging is performed under conditions necessary for cell activation. Due to the characteristics of the secondary battery, in order to activate the positive electrode active material during the first cycle and to generate a stable surface film (SEI, Solid Electrolyte Interface) at the negative electrode, this cell activation process should be performed first. In the cell activation process, a large amount of gas is generated inside the secondary battery. The generated gas is then removed through an opened or cut discharge port, and the gas discharge portion is heat-sealed again. As described above, the process of discharging the gas inside the secondary battery and heat-sealing the discharge passage is commonly referred to as a degassing process.

In the case of a pouch-type secondary battery, if the gas generated inside the secondary battery is not efficiently removed during the cell activation process as described above, the gas occupies a certain space inside the secondary battery, thereby swelling the central portion of the pouch exterior material, thereby causing deformation of the battery and adversely affecting battery performance and battery life such as capacity and output.

In some conventional technologies, a secondary battery after cell activation is fixed to a die and gas is removed by simple pressurization at the top, or the cell is activated while inserting the secondary battery into the two opposed flat jigs and applying pressure from both sides. The purpose of pressurization is to prevent gas generated during charging from being trapped inside the secondary battery. However, in the conventional pressurization method, since the gas inside the secondary battery corresponds to the fluid, when pressure is applied from the outside, it is dispersed in all directions without a certain direction. Herein, some gases may be collected and removed in the surplus portion for gas collection, but the gas dispersed in other directions remains inside the secondary battery.

In addition, a technique of applying a plate-shaped member provided with a plurality of strip-shaped pressing portions to a pressurizing jig has also been attempted. The pressurizing jig forms a pattern in which a plurality of strip-shaped pressing portions are repeated on the surface of the plate-shaped member, thereby imparting direction of gas trapped when the secondary battery is pressed. Thereafter, the trapped gas is discharged while roll-pressing the secondary battery. However, in this technology, when the secondary battery is pressed, since the pressurized area and the non-pressurized area are linearly divided, uniform pressurization of the entire area of the secondary battery is not achieved. In addition, there is a limitation in that the trapped gas is not sufficiently discharged by simply pressing the secondary battery under room temperature conditions.

As described above, in the related art, as the pressurization during charging in the cell activation step may rather hinder the gas discharge inside the secondary battery, the pressure may be applied the secondary battery step by step, which may make the process quite tricky. Therefore, there is a high need for a technology for fundamentally solving such problems.

DISCLOSURE

Technical Problem

The present invention was created in consideration of the above problems, and an object of the present invention is to provide a pressurizing jig capable of solving the problem of not effectively removing the gas generated inside the secondary battery in a short time and the problem of not being able to induce the gas generated inside the secondary battery to a specific part of the secondary battery, and a method for manufacturing a secondary battery using such a pressurizing jig.

Technical Solution

The pressurizing jig according to the present invention is a pressurizing jig for inserting a secondary battery at a space between a pair of plate-shaped members facing each other in the cell activation process of the secondary battery and pressing the secondary battery from opposite sides, and includes: a pair of plate-shaped members, each plate-shaped member having a plurality of protrusions spaced apart from each other on a surface thereof, the protrusions being in contact with the secondary battery when the plate-shaped member is pressed into contact with the secondary battery; and a heating unit that heats the projections formed on the plate-shaped member.

In one example, a plurality of protrusions formed on the plate-shaped member have a structure provided in a dot patterned form.

In a specific example, the protrusion formed on the plate-shaped member includes a cross-section which is parallel to the plate-shaped member and has a circular, elliptical, or n-gonal (n is an integer of 3 or more) shape.

In a specific example, the protrusion formed on the plate-shaped member is characterized in that the lower diameter of the side in contact with the plate-shaped member is equal to or greater than the upper diameter of the side in contact with the secondary battery, based on a cross-sectional shape perpendicular to the plate-shaped member. For example, the protrusion formed on the plate-shaped member has a rectangular, triangular, semicircular, or trapezoidal cross-sectional shape parallel to the plate-shaped member.

In one example, a plurality of protrusions provided in a dot patterned form have the same average diameter of the protrusions.

Further, in another example, in a plurality of protrusions provided in a dot patterned form, protrusions with a first average diameter and protrusions with a second average diameter are mixed, and a ratio of the first average to the second average diameter is in a range of 2 to 100.

In a specific example, a ratio of a formation area of the protrusions having the first average diameter and a formation area of the protrusions having the second average diameter is in the range of 0.1 to 1.5.

In yet another example, the heating unit includes a heating coil mounted on the plate-shaped member.

In addition, the present invention provides a method for manufacturing a secondary battery using the pressurizing jig described above. In one example, the method for manufacturing a secondary battery includes a cell activation step of performing a cell activation process for a secondary battery while heating and pressing with the pressurizing jig.

In one example, the method for manufacturing a secondary battery according to the present invention further includes a degassing step of removing gas inside the secondary battery by pressing the cell-activated secondary battery after the cell activation step.

In a specific example, the degassing step may be performed by inserting the secondary battery between a pair of plate-shaped members facing each other and pressing it from opposite sides.

In yet another specific example, the degassing step may be performed by roll-pressing the secondary battery in one direction.

For example, the secondary battery is a pouch-type secondary battery.

Advantageous Effects

According to a pressurizing jig according to the present invention and a method for manufacturing a secondary battery using the same, by providing a plurality of independently formed protrusions spaced apart from each other on the pressing surface of the jig, uniform pressurization of the secondary battery and smooth discharge of gas are induced. In addition, the pressurizing jig promotes the discharge of gas trapped inside the battery by heating the secondary battery at the same time when pressing using the jig during the cell activation process of the secondary battery.

BRIEF DESCRIPTION OF THE DRAWINGS

FIG. 1 is a schematic diagram showing a process of pressing a secondary battery using a pressurizing jig according to an embodiment of the present invention.

FIGS. 2 and 3 each show a pressing surface of a pressurizing jig according to an embodiment of the present invention.

FIG. 4 is a schematic diagram showing a roll pressing process according to another embodiment of the present invention.

FIGS. 5-8 are schematic diagrams showing various cross-section shapes of the plate-shaped member.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The pressurizing jig according to the present invention is a pressurizing jig for inserting a secondary battery at a space between a pair of plate-shaped members facing each other in the cell activation process of the secondary battery and pressing the secondary battery from both sides, and includes: a pair of plate-shaped members having a plurality of independently formed protrusions spaced apart from each other on a surface in contact with the secondary battery when pressed; and a heating unit that heats the projections formed on the plate-shaped member.

The pressurizing jig includes a pair of plate-shaped members for pressing the secondary battery, and a plurality of independently formed protrusions spaced apart from each other are provided on the pressing surfaces of the plate-shaped members. The protrusions formed on the pressing surface of the pressurizing jig according to the present invention have a structure that is independently formed by being spaced apart from each other, and through this, it is possible to implement even pressing on the front surface of the secondary battery.

In addition, in the present invention, heating is simultaneously performed when the secondary battery is pressurized through the formation of a heating unit. That is, in the cell activation process of the secondary battery, the secondary battery is pressurized using the protrusion heated by the heating unit. When the secondary battery is heated, the internal gas expands, and the expanded gas can be discharged relatively easily. In the present invention, the internal gas is expanded by heating the secondary battery, and at the same time, the expanded gas is easily separated from the trapped portion through pressurization.

In addition, since the present invention pressurizes the secondary battery with a plate-shaped member provided with protrusions that are spaced apart from each other and independently formed, the gas released from the trap portion in the battery is easily discharged along the unpressurized area between the protrusions. In particular, in the present invention, pressing and heating of the secondary battery can be concentrated in a specific area by means of a protrusion provided on the pressing surface of the plate-shaped member.

In one embodiment, a plurality of protrusions formed on the plate-shaped member have a structure provided in a dot patterned form. Specifically, the space between the independently formed projections serves to form a gas discharge passage. The pressurizing jig according to the present invention forms a plurality of dot-patterned projections to pressurize the entire surface of the secondary battery at an even pressure in the cell activation step of the secondary battery.

In one embodiment, the protrusion formed on the plate-shaped member includes a cross-section which is parallel to the plate-shaped member and has a circular, elliptical, or n-gonal (n is an integer of 3 or more) shape. The n-gonal shape includes a triangle, a quadrangle, a pentagon, a hexagon, and the like, and may have a shape close to a circle as the number of n increases. For example, n is an integer of 3 or more, and is an integer between 3 to 10. For another example, the protrusion formed on the plate-shaped member has a circular or rectangular cross-sectional shape parallel to the plate-shaped member. In the present invention, the "circle" should be interpreted as including a case substantially close to a circle as well as a case that is completely round in the physical sense. Specifically, in the n-gonal shape, when n exceeds 10, it can be interpreted as a substantially circular shape.

In a specific embodiment, the protrusion formed on the plate-shaped member is characterized in that the lower diameter of the side in contact with the plate-shaped member is equal to or greater than the upper diameter of the side in contact with the secondary battery, based on a cross-sectional shape perpendicular to the plate-shaped member. Specifically, as shown in FIGS. 5-8, the protrusion may have a cylindrical shape, a hemispherical shape, or a hexahedral shape. For example, the protrusion formed on the plate-shaped member has a rectangular, triangular, semicircular, or trapezoidal cross-sectional shape perpendicular to the plate-shaped member. When the vertical cross section of the protrusion is square, it means that the protrusion has a cylindrical or hexahedral shape. When the protrusion has a triangular cross section, the protrusion has a pointed tip shape. When the cross section of the protrusion is semicircular, the protrusion has a hemispherical shape. Further, when the cross section of the protrusion has a trapezoidal shape, the protrusion has a wide lower diameter and a narrow upper diameter.

In one embodiment, a plurality of protrusions provided in a dot patterned form have the same average diameter of the protrusions. This case includes a case where a plurality of protrusions having the same or similar size are uniformly distributed on the pressing surface of the plate-shaped member. For example, the average diameter of the projections is in the range of 1 to 200 mm, 10 to 200 mm, 80 to 200 mm, 1 to 100 mm, or 10 to 50 mm. In addition, the spaced distance between the protrusions is in the range of 1 to 100 mm, 1 to 80 mm, 10 to 100 mm, 50 to 100 mm, or 10 to 30 mm.

In another embodiment, the plurality of protrusions provided in a dot patterned form have a structure in which protrusions having an average diameter D1 and protrusions having an average diameter D2 are mixed. This case includes a case where the diameters of the protrusions distributed on the pressing surface of the plate-shaped member are different from each other. For example, the present invention includes a case where two kinds of protrusions having different diameters are distributed on the pressing surface of the plate-shaped member. Specifically, the ratio of the average diameters D1 and D2 (D1/D2) is in the range of 2 to 100, 2 to 20, 2 to 10, or 3 to 7. For example, the average diameter D1 ranges from 50 to 200 mm, and the average diameter D2 ranges from 1 to 100 mm. Specifically, the average diameter D1 is in the range of 70 to 120 mm, and the average diameter D2 is in the range of 10 to 50 mm. In addition, the spaced distance between the protrusions is in the range of 1 to 100 mm, 1 to 80 mm, 10 to 100 mm, 50 to 100 mm, 10 to 70 mm, or 10 to 30 mm.

In a specific embodiment, the ratio of the formation area of the protrusion having the average diameter D1 and the protrusion having the average diameter D2 (the formation area of the protrusion having the average diameter D1/the formation area of the protrusion having the average diameter D2) is in the range of 0.1 to 1.5. Specifically, the area ratio is in the range of 0.1 to 1, 0.1 to 0.5, 0.5 to 1.5, or 0.8 to 1.2.

In one embodiment, the pressurizing jig includes a heating unit that heats a protrusion formed on the plate-shaped member, and the heating unit includes a heating coil mounted on the plate-shaped member. In the pressurizing jig according to the present invention, the heating unit has a structure mounted on the plate-shaped member, but the structure formed outside the plate-shaped member is not excluded.

In addition, the present invention provides a method for manufacturing a secondary battery using the pressurizing jig described above. Specifically, the pressurizing jig may be applied in the cell activation step of the secondary battery. In one embodiment, a method of manufacturing a secondary battery according to the present invention includes a cell activation step of performing a cell activation process while heating and pressing the secondary battery with the pressurizing jig.

The pressurizing jig according to the present invention can be applied to, for example, a manufacturing process of a pouch-type secondary battery. The pouch-type secondary battery has a structure in which a stack-type or stack/folding-type electrode assembly is embedded in a pouch-shaped battery case formed of an aluminum laminate sheet. The assembled secondary battery undergoes a cell activation process in the manufacturing process of the battery. The cell activation process is performed by applying a current to a predetermined voltage to the electrode assembly impregnated with an electrolyte.

During the initial charging/discharging process for cell activation, a protective film is formed on the surface of the electrode and a part of the electrolyte is decomposed, thereby generating a large amount of gas. In order to remove the generated gas inside the battery cell, a surplus portion is formed on one side of the battery case of the pouch-type battery. Gas pockets are formed as the gas inside the battery cell is collected in the surplus portion of the battery case. After opening one side of the gas pocket to discharge the internal gas, the battery cell is sealed again.

In the present invention, the cell activation step to which the above-described pressurizing jig is applied is performed, and for a secondary battery that has undergone the cell activation step, a gas removing step, in which the gas at the inside of the battery is removed, may be performed. In one embodiment, the method for manufacturing a secondary battery according to the present invention further includes a degassing step of removing gas inside the secondary battery by pressing the cell-activated secondary battery after the cell activation step.

In the conventional pressurization method, the gas inside the secondary battery is dispersed in all directions without a certain direction. Here, some gases may be collected in the surplus portion for gas collection and removed, but the gas dispersed in other directions remains inside the secondary battery. However, the pressurizing jig according to the present invention applies a plate-shaped member having a plurality of independently formed protrusions spaced apart from each other, thereby applying a uniform pressure to the front surface of the secondary battery while simultaneously collecting the trapped gas and inducing smooth discharge. However, some of the trapped gas is not removed simply by mechanically pressurizing. Since the pressurizing jig according to the present invention applies pressure and heat at the same time, it induces volume expansion of the trapped gas, and the expanded gas can be smoothly removed by applying pressure. In addition, if necessary, it is possible to easily remove the gas remaining in the secondary battery in a subsequent process.

In one embodiment, the degassing step may be performed by inserting a secondary battery between a pair of plate-shaped members facing each other and pressing it from both sides. In this case, the secondary battery that has passed through the cell activation step is sandwiched between a pair of plate-shaped members facing each other and pressurized from both sides, thereby discharging the gas inside the battery.

In yet another embodiment, the step of removing gas may be performed by roll-pressing the secondary battery in one direction. In this case, the secondary battery that has undergone the cell activation step is roll-pressed in one direction, and through this, the gas remaining inside the battery is driven in one direction and discharged.

In one embodiment, the secondary battery is a pouch-type secondary battery. In addition, the secondary battery in the present invention is, for example, a lithium secondary battery. The lithium secondary battery may include, for example, an electrode assembly described above; a non-aqueous electrolyte impregnating the electrode assembly; and a battery case containing the electrode assembly and the non-aqueous electrolyte. For example, the secondary battery is a pouch-type lithium secondary battery.

The positive electrode has a structure in which a positive electrode mixture layer is stacked on one or both sides of a positive electrode current collector. The positive electrode active materials may each independently be a lithium-containing oxide, and may be the same or different. A lithium-containing transition metal oxide may be used as the lithium-containing oxide. In one example, the positive electrode mixture layer includes a conductive material and a binder polymer in addition to the positive electrode active material, and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\leq y<1$), $Li_xNi_{1-y}Mn_yO_2$ ($0.5<x<1.3$, $0\leq y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$), and the lithium-containing transition metal oxide may be coated with a metal or metal oxide such as aluminum (Al). Further, in addition to the lithium-containing transition metal oxide, one or more of sulfide, selenide, and halide may be used.

The positive electrode active material may be included in the range of 94.0 to 98.5 wt % in the positive electrode active material layer. When the content of the positive electrode active material satisfies the above range, it is advantageous in terms of manufacturing a high-capacity battery and providing sufficient conductivity of the positive electrode or adhesion between electrode materials.

The current collector used for the positive electrode is a metal having high conductivity, and any metal which the positive electrode active material slurry may be easily attached to and which is not reactive in the voltage range of the secondary battery can be used. Specifically, non-limiting examples of the current collector for the positive electrode include aluminum, nickel, or a foil manufactured by a combination thereof.

The positive electrode active material layer further includes a conductive material. The conductive material is usually added in an amount of 1 to 30% by weight based on the total weight of the mixture including the positive electrode active material. Such a conductive material is not particularly limited as long as it has conductivity without causing a chemical change in the secondary battery. For example, one or more selected from the group consisting of graphite such as natural graphite or artificial graphite; carbon black such as carbon black, acetylene black, ketjen black, channel black, furnace black, lamp black, or thermal black; conductive fiber such as carbon fiber or metal fiber; metal powder such as carbon fluoride, aluminum, or nickel powder; conductive whiskey such as zinc oxide or potassium titanate; conductive metal oxide such as titanium oxide; and polyphenylene derivative may be used as the conductive material.

As the binder component, a binder polymer commonly used in the art may be used without limitation. For example, various kinds of binders such as polyvinylidene fluoride-co-hexafluoropropylene (PVDF-co-HFP), polyvinylidene fluoride (PVDF), polyacrylonitrile, polymethyl methacrylate, styrene-butadiene rubber (SBR), and carboxyl methyl cellulose (CMC) may be used.

The negative electrode may further include a negative electrode mixture layer, and may include a carbon material, lithium metal, silicon, or tin. When a carbon material is used as the negative electrode active material, both low crystalline carbon and high crystalline carbon may be used. Representative examples of low crystalline carbon include soft carbon and hard carbon are typical. Representative examples of high crystalline carbon include natural graphite, kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a foil manufactured by a copper alloy or a combination thereof. In addition, the current collector may be used by stacking substrates made of the above materials.

In addition, the negative electrode may include a conductive material and a binder commonly used in the art.

The separator may be made of any porous substrate used in a lithium secondary battery, and for example, a polyolefin-based porous membrane or a nonwoven fabric may be used, but the present invention is not particularly limited thereto.

Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, and polypentene, are each formed alone or in a mixture thereof.

Polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, and polyethylenenaphthalene, etc. may be used individually or as a polymer by a mixture thereof, to thereby form the non-woven fabric, in addition to polyolefin-based nonwoven fabric. The structure of the nonwoven fabric may be a spunbond nonwoven fabric composed of long fibers or a melt blown nonwoven fabric.

The thickness of the porous substrate is not particularly limited, but may be 5 to 50 μm, and the pore size and porosity present in the porous substrate are also not particularly limited, but may be 0.01 to 50 μm and 10 to 95%, respectively.

Meanwhile, in order to improve mechanical strength of the separator composed of the porous substrate and to suppress a short circuit between the positive electrode and the negative electrode, a porous coating layer including inorganic particles and a binder polymer may be further included on at least one surface of the porous substrate.

The electrolyte may contain an organic solvent and an electrolyte salt, and the electrolyte salt is a lithium salt. Those conventionally used in the electrolyte for lithium secondary batteries may be used as the lithium salt without limitation. For example, one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $CF_3(CF_2)_7SO_3^-$, $CF_3CO_2^-$, $CH_3CO_2^-$, $SCN^-$ and $(CF_3CF_2SO_2)_2N^-$ may be included as the anion of the lithium salt.

As the organic solvent included in the electrolyte described above, those conventionally used in electrolytes for lithium secondary batteries may be used without limitation, and for example, ethers, esters, amides, linear carbonates, and cyclic carbonates may be used alone or in combination of two or more. Among them, representatively, a cyclic carbonate, a linear carbonate, or a carbonate compound that is a mixture thereof may be included.

Specific examples of the cyclic carbonate compound include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and a halide thereof, and a mixture thereof. These halides include, for example, fluoroethylene carbonate (FEC), but are not limited thereto.

In addition, specific examples of the linear carbonate compound include any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more of them may be typically used, but is not limited thereto.

In particular, among the carbonate-based organic solvents, ethylene carbonate and propylene carbonate, which are cyclic carbonates, are organic solvents of high viscosity and have high dielectric constants, so that lithium salts in the electrolyte can be more easily dissociated, and if the cyclic carbonate is mixed with a low viscosity, low dielectric constant linear carbonate such as dimethyl carbonate and diethyl carbonate in an appropriate ratio, an electrolyte solution having a higher electrical conductivity can be prepared.

In addition, as the ether of the organic solvent, any one selected from the group consisting of dimethyl ether, diethyl ether, dipropyl ether, methylethyl ether, methylpropyl ether, and ethylpropyl ether, or a mixture of two or more thereof may be used, but is not limited thereto.

And esters among the organic solvents include any one selected from the group consisting of methyl acetate, ethyl acetate, propyl acetate, methyl propionate, ethyl propionate, propyl propionate, γ-butyrolactone, γ-valerolactone, and γ-caprolactone, or a mixture of two or more of them, but the present invention is not limited thereto.

The injection of the non-aqueous electrolyte may be performed at an appropriate step in the manufacturing process of the electrochemical device, depending on the manufacturing process and required physical properties of the final product. That is, it can be applied before assembling the electrochemical device or at the final stage of assembling the electrochemical device.

In addition, the present invention provides a vehicle including the secondary battery described above. In a specific example, the vehicle is a hybrid or electric vehicle.

Hereinafter, the present invention will be described in more detail through examples and drawings. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

First Embodiment

FIG. 1 is a schematic diagram showing a process of pressing a secondary battery using a pressurizing jig according to an embodiment of the present invention. Referring to FIG. 1, a pouch-type secondary battery 40 has a structure in which an electrode assembly 10 is embedded in a pouch-shaped battery case formed of an aluminum laminate sheet. First and second electrode tabs 21 and 22 are exposed at both ends of the secondary battery 40 and a surplus portion is formed on one side of the battery case. A gas pocket 30 is formed as the internal gas in the secondary battery is collected in the surplus portion of the battery case. After opening one side of the gas pocket 30 to discharge the internal gas, the battery is sealed again.

The assembled secondary battery 40 undergoes a cell activation process in the manufacturing process of the battery. The cell activation process is performed by applying a current to a predetermined voltage to the electrode assembly 10 impregnated with an electrolyte. During the initial charging/discharging process for cell activation, a protective film is formed on the surface of the electrode and a part of the electrolyte is decomposed, thereby generating a large amount of gas.

In the present invention, in the cell activation process of the secondary battery, the secondary battery 40 is interposed between the pair of plate-shaped members 110 and 120 facing each other of the pressurizing jig 100 and pressurized and heated from both sides. The pressurizing jig 100 has a structure in which a plurality of protrusions 130 independently formed by being spaced apart from each other are provided on a surface in contact with the secondary battery 40 when pressurized. In addition, it includes a heating unit 111 and 121 for heating the protrusions 130 formed on the plate-shaped members 110 and 120. The heating unit has a heating coil mounted in the plate-shaped members 110 and 120.

A plurality of protrusions 130 form a dot pattern on the pressurizing surfaces of the plate-shaped members 110 and 120 of the pressurizing jig 100. The protrusion 130 has a form in which a cylindrical shape is protruded. The average diameter of the protrusions 130 is approximately 30 mm, and the spaced distance between the protrusions 130 is 25 mm.

Second Embodiment

FIG. 2 is a schematic diagram showing a process of pressing a secondary battery using a pressurizing jig according to another embodiment of the present invention. Referring to FIG. 2, in the cell activation process of the secondary battery, the secondary battery 40 is interposed between the pair of plate-shaped members 210 and 220 facing each other of the pressurizing jig 200 and pressurized and heated from both sides. Since the description of the secondary battery 40 is the same as described in the description of FIG. 1, it will be omitted here.

The pressurizing jig 200 has a structure in which a plurality of protrusions 230 independently formed by being spaced apart from each other are provided on a surface in contact with the secondary battery 40 when pressurized. In addition, it includes a heating unit 211 and 221 for heating the protrusions 230 formed on the plate-shaped members 210 and 220. The heating unit has a heating coil mounted in the plate-shaped members 210 and 220.

A plurality of protrusions 230 form a dot pattern on the pressurizing surfaces of the plate-shaped members 210 and 220 of the pressurizing jig 200. The protrusion 230 has a form in which a cylindrical shape is protruded. The average diameter of the protrusions 230 is approximately 20 mm, and the spaced distance between the protrusions 230 is 15 mm.

Third Embodiment

FIG. 3 is a schematic diagram showing a process of pressing a secondary battery using a pressurizing jig according to another embodiment of the present invention. Referring to FIG. 3, in the cell activation process of the secondary battery, the secondary battery 40 is interposed between the pair of plate-shaped members 310 and 320 facing each other of the pressurizing jig 300 and pressurized and heated from both sides. Since the description of the secondary battery 40 is the same as described in the description of FIG. 1, it will be omitted here.

The pressurizing jig 300 has a structure in which a plurality of protrusions 331 and 332 independently formed by being spaced apart from each other are provided on a surface in contact with the secondary battery 40 when pressurized. In addition, it includes a heating unit 311 and 321 for heating the protrusions 331 and 332 formed on the plate-shaped members 310 and 320. The heating unit has a heating coil mounted in the plate-shaped members 310 and 320.

A plurality of protrusions 331 and 332 form a dot pattern on the pressurizing surfaces of the plate-shaped members 310 and 320 of the pressurizing jig 300. The protrusions 331 and 332 have a cylindrical shape 331 having a large diameter and a cylindrical shape 332 having a small diameter protruding. The cylindrical protrusions 331 having a large diameter have an average diameter of about 35 mm, and a spaced distance between the protrusions 331 is 30 mm. The cylindrical protrusions 332 having a small diameter have an average diameter of about 10 mm and are arranged in a space between the cylindrical protrusions 331 having a large diameter.

Fourth Embodiment

FIG. 4 is a schematic diagram showing a roll pressing process according to an embodiment of the present invention. A roll pressing step may be performed on the secondary battery that has passed the cell activation step. Some residual gas may exist inside the secondary battery that has gone through the cell activation step. In the present invention, by performing an additional roll pressing step, the gas remaining in the secondary battery is effectively discharged. Referring to FIG. 4, the secondary battery 60, which has passed the cell activation step, is roll pressed from the bottom to the top. The upper side of the secondary battery 60 has a structure in which a gas pocket 50 is formed, and the gas remaining in the secondary battery 60 moves toward the gas pocket 50 during roll pressing. Roll pressing is performed while pressing the front surface of the secondary battery 60 through a roller 70 in one direction. The roller 70 moves while rotating based on the roller shaft 71 in the center. Meanwhile, in FIG. 4, the secondary battery 60 is shown to be in a horizontal direction with the ground, but is not limited thereto. Specifically, the secondary battery 60 may be disposed in a direction perpendicular to the ground, and the secondary battery 60 is roll pressed from the bottom to the top. In addition, the direction of roll pressing is not particularly limited as long as it is roll pressed from the gas pocket 50 to the bottom of the secondary battery 60, and may be roll pressed in both directions (electrode tab direction) of the secondary battery 60.

DESCRIPTION OF REFERENCE NUMERALS

10: electrode assembly
21: first electrode tab
22: second electrode tab
30, 50: gas pocket
40, 60: secondary battery
70: roller
71: roller shaft
100, 200, 300: pressurizing jig
110, 120, 210, 220, 310, 320: plate-shaped member
130, 230, 331, 332: protrusion
111, 121, 211, 221, 311, 321: heating unit

The invention claimed is:

1. A pressurizing jig for inserting a secondary battery between a pair of plate-shaped members facing each other in a cell activation process of the secondary battery and pressing the secondary battery from opposite sides, the pressurizing jig comprising:
the pair of plate-shaped members, each plate shaped member having:
a plurality of protrusions spaced apart from each other on a surface thereof, the protrusions being configured to be in contact with the secondary battery when the plate-shaped member is pressed into contact with the secondary battery; and
a heating unit configured to heat the protrusions formed on the plate-shaped member,
wherein the plurality of protrusions formed on the plate-shaped member are formed in a dot patterned structure.

2. The pressurizing jig of claim 1, wherein, for each of the protrusions formed on the plate-shaped member, a cross-sectional shape parallel to the plate-shaped member is one of a circular, elliptical, or n-gonal shape where n is an integer of 3 or more.

3. The pressurizing jig of claim 1, wherein, for each of the protrusions formed on the plate-shaped member, a lower diameter of a side in contact with the plate-shaped member is equal to or greater than an upper diameter of a side in contact with the secondary battery, based on a cross-sectional shape parallel to the plate-shaped member.

4. The pressurizing jig of claim 3, wherein, for each of the protrusions formed on the plate-shaped member, a cross-sectional shape perpendicular to the plate-shaped member is a rectangular, triangular, semicircular, or trapezoidal shape.

5. The pressurizing jig of claim 1, wherein average diameters of respective protrusions are equal.

6. The pressurizing jig of claim 1, wherein protrusions with a first average diameter and protrusions with a second average diameter are mixed within the dot pattern, and a ratio first average diameter to the second average diameter is in a range of 2 to 100.

7. The pressurizing jig of claim 6, wherein a ratio of a formation area of the protrusions having the first average diameter and a formation area of the protrusions having the second average diameter is in a range of 0.1 to 1.5.

8. The pressurizing jig of claim 1, wherein the heating unit includes a heating coil mounted on the plate-shaped member.

9. A method for manufacturing a secondary battery, the method comprising a cell activation step of performing a cell activation process for a secondary battery while heating and pressing with the pressurizing jig according to claim 1.

10. The method of claim 9, further comprising, after the cell activation step, a degassing step of removing gas inside the secondary battery by pressurizing the cell-activated secondary battery.

11. The method of claim 10, wherein the degassing step is performed by inserting the secondary battery between the pair of plate-shaped members facing each other and pressing the secondary battery from both sides.

12. The method of claim 10, wherein the degassing step is performed by roll-pressing the secondary battery in one direction.

13. The method of claim 9, wherein the secondary battery is a pouch-type secondary battery.

14. A pressurizing jig for inserting a secondary battery between a pair of plate-shaped members facing each other in a cell activation process of the secondary battery and pressing the secondary battery from opposite sides, the pressurizing jig comprising:
the pair of plate-shaped members, each plate shaped member having:
a plurality of protrusions spaced apart from each other on a surface thereof, the protrusions being configured to be in contact with the secondary battery when the plate-shaped member is pressed into contact with the secondary battery; and
a heating unit configured to heat the protrusions formed on the plate-shaped member, the heating unit including a heating coil mounted on the plate-shaped member.

* * * * *